Figures 1, 3:
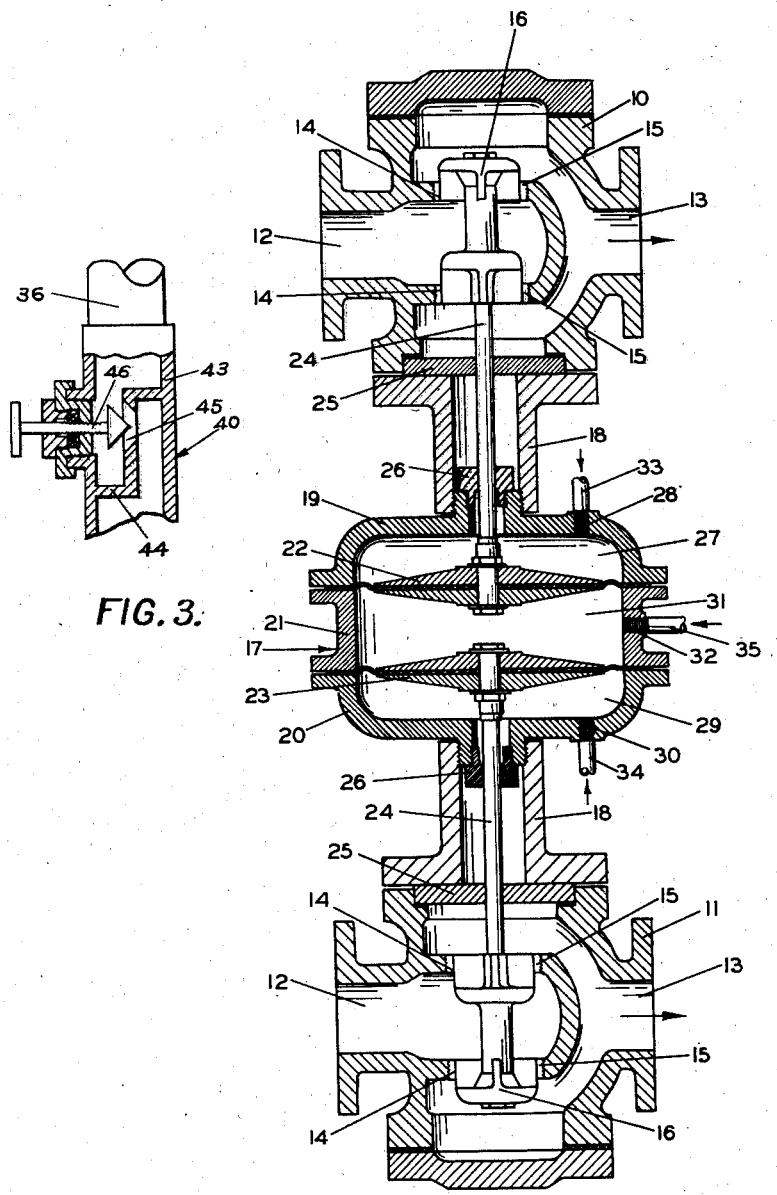

March 16, 1943.  R. E. BAILEY  2,313,797
BLENDING APPARATUS
Filed July 1, 1941  2 Sheets-Sheet 1

INVENTOR
R. E. BAILEY
BY
ATTORNEY

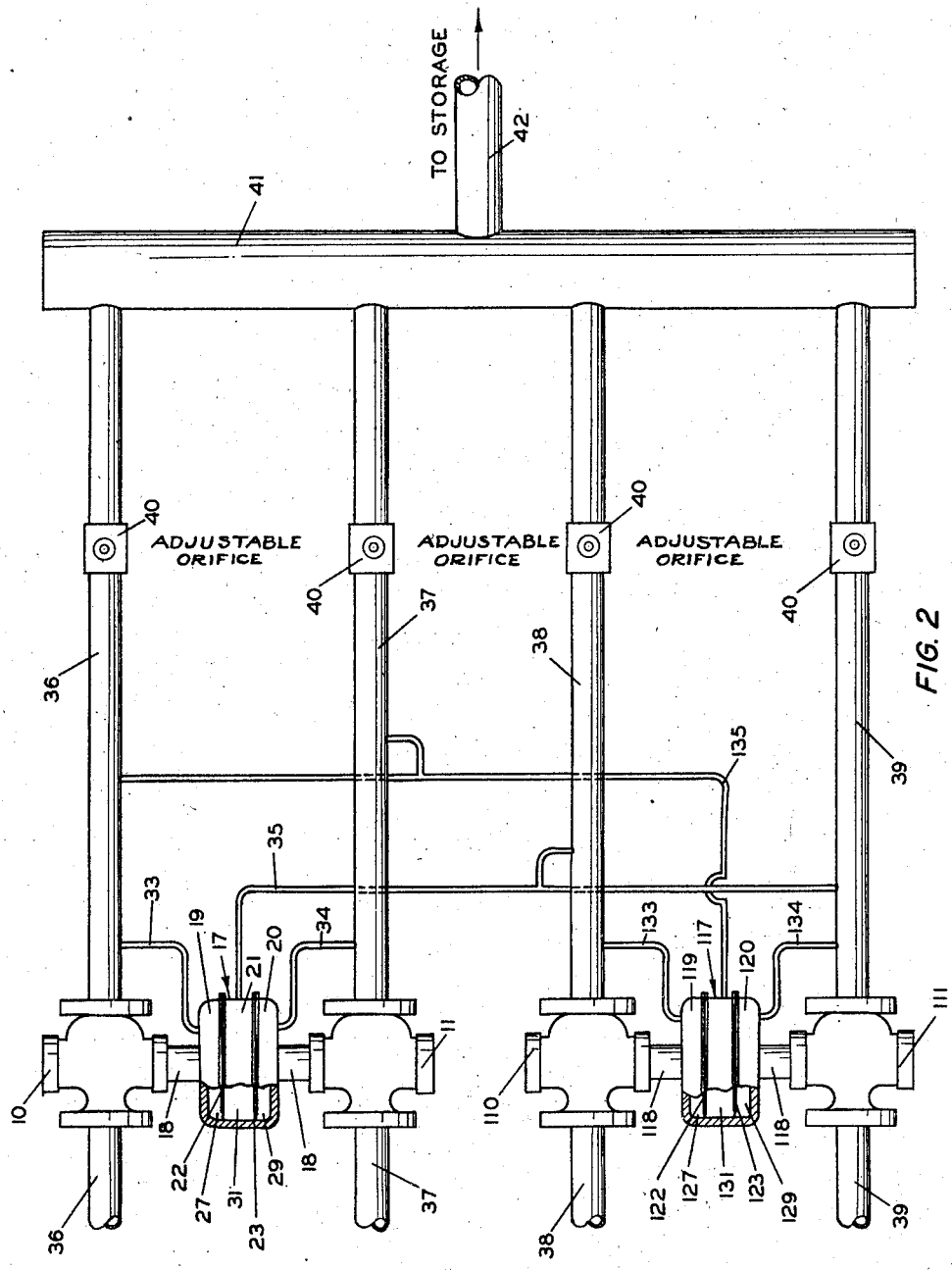

Patented Mar. 16, 1943

2,313,797

UNITED STATES PATENT OFFICE 2,313,797

BLENDING APPARATUS

Roy E. Bailey, Bartlesville, Okla., assignor to Phillips Petroleum Company, a corporation of Delaware Application July 1, 1941, Serial No. 400,703

6 Claims. (Cl. 137—165)

This invention relates to blending and more particularly to apparatus for blending a plurality of fluids in any desired volumetric ratio.

Present-day practice in the art of blending fluids requires a considerable number of valves, pipe lines, storage and mixing tanks and mechanical mixing devices to accurately blend a plurality of fluids. In certain industries, such as the petroleum industry, it is common to mix a number of fluids, each with different properties, in a definite proportion to form a blend of the fluids. This may be accomplished by mixing predetermined amounts of the various fluids in tanks with mechanical mixing devices. It has become common in many instances to blend two streams of fluid into a single stream by the use of a blending valve; however, in order to blend a greater number of streams, mixing tanks are usually employed, because it is uneconomical to employ blending valves in series.

By the practice of my invention, I am able to blend any number of streams of fluid in any desired volumetric ratio, which can be changed by the attendant, with the practice of a minimum of mechanical skill. I eliminate numerous storage and mixing tanks, pipe lines, and mechanical mixing devices and thereby reduce the initial installation costs. Further, my system will automatically shut down in case the fluid in one stream ceases to flow from such causes as line breakage, pump failure, and the like.

My invention has for its primary object the provision of an apparatus for blending a plurality of fluid streams in any desired volumetric ratio.

Another object is to provide an apparatus for blending a plurality of fluid streams which will automatically operate to close down the entire blending system in the event of a line break, a pump failure, or any other cause which stops the flow of fluid through any one of the lines.

A further object of my invention is to provide a blending apparatus which is simple and economical in construction and operation.

These and additional objects and advantages will be apparent to persons skilled in the art by reference to the following description and annexed drawings, wherein Figure 1 is a plan view, partly in cross section, of a part of the apparatus of my invention, Figure 2 is a plan view of my invention, partly in cross section, illustrating the general arrangement of the apparatus employed for blending a plurality of fluid streams, and Figure 3 is a central longitudinal view, partly in cross section, through an adjustable orifice valve adapted to be employed in the practice of my invention.

Referring to the drawings and more particularly to Figure 1, I have denoted a pair of valve castings by reference numerals 10 and 11, each of which is provided with an inlet 12, an outlet 13, and dual openings 14 which allows communication between the inlet and the outlet. Each of the openings is provided with a valve seat 15, which is adapted to receive a "balanced" valve head 16. While I prefer to employ a balanced type of valve, due to certain inherent advantages of this valve, I do not desire to limit my invention to any particular type of valve. Valve castings 10 and 11 are attached to a diaphragm housing 17 by means of sleeves 18. The diaphragm housing has a pair of end plates 19 and 20 which are separated by a spacer member 21. A pair of flexible diaphragms 22 and 23 are positioned between the end plates and the spacer member. The diaphragms are secured to valve stems 24, which in turn are secured to the balanced valve heads. Thus, the opening and closing of the valve heads may be responsive to the movement of the diaphragms. The valve stems are free to reciprocate through sleeves 18, a pair of supports 25, which are provided in valve castings 10 and 11 adjacent to sleeves 18, and a pair of packing glands 26, which are provided in end plates 19 and 20, respectively. It will be noted that the diaphragm housing is divided into three chambers; namely, an outer chamber 27, which is formed between diaphragm 22 and end plate 19, and which is provided with an outlet opening 28; a second outer chamber 29, which is formed between diaphragm 23 and end plate 20, and which is provided with an outlet opening 30; and an inner chamber 31 which is formed in the spacer member of the diaphragm housing between the two diaphragms and which is provided with an outlet opening 32. Outlet openings 28, 30 and 32 are adapted to receive equalizing lines 33, 34, and 35, respectively. As shown in Figure 2, valve casting 10 is placed across a conduit 36, and valve casting 11 is placed across a conduit 37. Similarly, a second pair of conduits 38 and 39 are provided with apparatus that is identical to that placed across conduits 36 and 37. It will be noted that like parts of this apparatus are designated by reference numerals which exceed by one hundred the reference numerals used in describing the parts of the apparatus shown in Figure 1. For example, valve castings 110 and 111, which are placed in conduits 38 and 39, respectively, are identical to valve castings 10 and 11, which are placed in conduits 36 and 37; diaphragms 122 and 123 are identical to diaphragms 22 and 23, and an inner chamber 131 is identical to inner chamber 31. It will be noted that lines 33 and 34 allow communication between chambers 27 and 29, and conduits 36 and 37, respectively. Similarly, lines 133 and 134 allow communication between chambers 127 and 129, and conduits 38 and 39, respectively. Chamber 31 communicates with conduits 38 and 39 through line 35. Chamber 131 communicates with conduits 36 and 37 through line 135. Adjustable orifices 40 are placed in conduits 36, 37, 38, and 39, in order to provide any desired volumetric ratio of fluids flowing through the conduits; and they may be of any desired well known type, as indicated in Figure 3, wherein there is illustrated a valve body 43, a partition 44 across the interior of the valve body and having a passage 45, and an adjustable needle valve 46 which is adapted to coact with the passage to control the flow of fluid through said conduits. The orifices are placed intermediate the junctures of the equalizing lines and the conduits and a manifold 41 which communicates with conduits 36, 37, 38, and 39. The manifold has an outlet pipe 42 which communicates with suitable disposal apparatus, such as a storage tank (not shown). Under certain operating conditions it may be desirable to eliminate the manifold and connect the conduits directly into the storage tank.

For the purpose of describing the mode of operation of my invention, let us first direct our attention to two of the conduits, such as conduits 36 and 37. Let us assume that a fluid is being conveyed through the conduits and that adjustable orifices 40 are set to a desired ratio of the fluid flowing through both conduits. For example, forty percent of the total fluid is to flow through conduit 36 and sixty percent through conduit 37. Chamber 31 is filled with an incompressible fluid and its outlet opening 32 plugged in any well known manner. Equalizing line 33 conducts fluid from conduit 36 to outer chamber 27. Similarly, equalizing line 34 conducts fluid from conduit 37 to outer chamber 29. If the pressure in conduit 36 is greater than the pressure in conduit 37, the pressure in chamber 27 will be greater than the pressure in chamber 29. As the pressures in the outer chambers of diaphragm housing 17 will tend to equalize, both of the diaphragms move downwardly with respect to the apparatus shown in Figure 1. As valve stems 24 are directly connected to valve heads 16 and to diaphragms 22 and 23, this movement of the diaphragms urges the valve heads in valve casting 10 downwardly, partially closing openings 14 which restricts the flow of fluid therethrough, causing the pressure in conduit 36 between the valve casting and orifice 40 to decrease, and at the same time, moves the valve heads in valve casting 11 downwardly to allow more fluid to flow therethrough, causing the pressure in conduit 37 between the valve casting and orifice 40 to increase. Thus, the pressures of the fluid in the conduits may become equalized. By maintaining equal pressures on two streams which flow through separate orifices, I can blend the two streams of fluid in any desired volumetric ratio.

For a description of the operation of the blending system, illustrated in Figure 2, let us assume that the total fluid in manifold 41 is to be a blend of the fluids from conduits 36, 37, 38, and 39. The adjustable orifices are set to provide the desired proportion of each fluid in the blend. As chamber 31 is in communication with conduits 38 and 39, the pressure of the fluid within the chamber is equal to the pressure of the fluid in the conduits. Likewise, as chamber 131 is in communication with conduits 36 and 37, the pressure of the fluid within chamber 131 is equal to the pressure of the fluid in conduits 36 and 37. It will be apparent that by making the valve heads of the various valve castings responsive to the movement of diaphragms, which in turn are responsive to the pressures in the various conduits, I am able to equalize the pressures in the conduits between the valve castings and the adjustable orifices by automatically controlling the volume of fluid flowing through the valve castings. As all conduits discharge into a common receptacle, the pressures of the fluid on the downstream side of the orifices in each conduit will be equal. Thus, by equalizing the pressures in the conduits, I am able to obtain a desired blend of the fluids flowing therethrough.

The equalization of pressure in the conduits will be especially advantageous in event that fluid ceases to flow through one of the conduits. Let us assume that the pressure in the conduits downstream of the valve castings is equalized, and that fluid unexpectedly ceases to flow through one of the conduits, such as conduit 36. The pressure in conduit 36 will then drop to the pressure of the fluid in the manifold or storage tank. The pressures in conduits 36 and 37 tend to equalize, causing a drop in pressure in conduit 37. As the pressure in chamber 131 is responsive to the pressure in conduits 36 and 37, diaphragms 122 and 123 will move toward each other, causing the valve heads of valve castings 110 and 111 to decrease the flow of fluid therethrough, which results in a drop of pressure in conduits 38 and 39. The reduction of pressure in these conduits causes a reduction in pressure in chamber 31, which causes diaphragms 22 and 23 to further close the openings in valve castings 10 and 11. The pressures in the conduit will thus tend to equalize until the flow in all conduits has been stopped, as diaphragms 22, 23, 122, and 123 are responsive to the pressures in conduits 36, 37, 38, and 39.

From the foregoing, it is believed that the operation and advantages of the apparatus for practicing my instant invention will be readily comprehended by persons skilled in the art. It is to be clearly understood, however, that various changes in the apparatus shown and described may be resorted to without departing from the spirit of the invention, as defined by the appended claims.

I claim:

1. In a system for equalizing the pressure of fluids flowing through a plurality of conduits which communicate with a receptacle, the combination comprising a pair of housings, each housing including a pair of end walls, and a pair of movable partitions spaced from each other and from the end walls to divide the interior of the housing into a pair of end compartments and a compartment intermediate the partitions, means for establishing communication between each end compartment of the housings and a corresponding conduit, means for establishing communication between the compartment intermediate the partitions in each housing and the conduits communicating with the end compartments in the other housing, and means responsive to movement of each partition for controlling the flow of fluid through a corresponding conduit.

2. In a system for equalizing the pressure of fluids flowing through a plurality of conduits which communicate with a receptacle, the combination comprising a pair of housings, each housing including a pair of end walls, and a pair of movable diaphragms spaced from each other and from the end walls to divide the interior of the housing into a pair of end compartments and a compartment intermediate the diaphragms, means for establishing communication between each end compartment of the housings and a corresponding conduit, means for establishing communication between the compartment intermediate the diaphragms in each housing and the conduits communicating with the end compartments in the other housing, and means responsive to movement of each diaphragm for controlling the flow of fluid through a corresponding conduit.

3. In a system for equalizing the pressure of fluids flowing through a plurality of conduits which communicate with a receptacle, the combination comprising a pair of housings, each housing including a pair of end walls, and a pair of movable partitions spaced from each other and from the end walls to divide the interior of the housing into a pair of end compartments and a compartment intermediate the partitions, means for establishing communication between each end compartment of the housings and a corresponding conduit, means for establishing communication between the compartment intermediate the partitions in each housing and the conduits communicating with the end compartments in the other housing, a valve in each conduit, and means responsive to movement of each partition for actuating the valve in a corresponding conduit to control the flow of fluid therethrough.

4. In a system for equalizing the pressure of fluids flowing through a plurality of conduits which communicate with a receptacle, the combination comprising a pair of housings, each housing including a pair of end walls, and a pair of movable diaphragms spaced from each other and from the end walls to divide the interior of the housing into a pair of end compartments and a compartment intermediate the diaphragms, means for establishing communication between each end compartment of the housings and a corresponding conduit, means for establishing communication between the compartment intermediate the diaphragms in each housing and the conduits communicating with the end compartments in the other housing, a valve in each conduit, and means responsive to movement of each diaphragm for actuating the valve in a corresponding conduit to control the flow of fluid therethrough.

5. In a system for blending fluids flowing through a plurality of lines which communicate with a receptacle, the combination comprising a valve in each line, a variable orifice downstream of the valve in each line, a pair of housings, each housing including a pair of end walls, and a pair of movable partitions spaced from each other and from the end walls to divide the interior of the housing into a pair of end compartments and a compartment intermediate the partitions, a conduit for establishing communication between each end compartment of the housings and a corresponding line, a conduit for establishing communication between the compartment intermediate the partitions in each housing and the lines communicating with the end compartments of the other housing, the above mentioned conduits communicating with the respective lines intermediate the corresponding valves and orifices, and means responsive to movement of each partition for actuating the valve in a corresponding conduit to control the flow of fluid therethrough.

6. In a system for blending fluids flowing through a plurality of lines which communicate with a receptacle, the combination comprising a valve in each line, a variable orifice downstream of the valve in each line, a pair of housings, each housing including a pair of end walls, and a pair of movable diaphragms spaced from each other and from the end walls to divide the interior of the housing into a pair of end compartments and a compartment intermediate the diaphragms, a conduit for establishing communication between each end compartment of the housings and a corresponding line, a conduit for establishing communication between the compartment intermediate the partitions in each housing and the lines communicating with the end compartments of the other housing, the above mentioned conduits communicating with the respective lines intermediate the corresponding valves and orifices, and means responsive to movement of each diaphragm for actuating the valve in a corresponding conduit to control the flow of fluid therethrough.

ROY E. BAILEY.